US009336008B2

(12) United States Patent
Damaraju et al.

(10) Patent No.: US 9,336,008 B2
(45) Date of Patent: May 10, 2016

(54) SHARED FUNCTION MULTI-PORTED ROM APPARATUS AND METHOD

(75) Inventors: Satish K. Damaraju, El Dorado Hills, CA (US); Subramaniam Maiyuran, Gold River, CA (US)

(73) Assignee: INTEL CORPORATION, Santa Clara, CA (US)

( * ) Notice: Subject to any disclaimer, the term of this patent is extended or adjusted under 35 U.S.C. 154(b) by 439 days.

(21) Appl. No.: 13/338,887

(22) Filed: Dec. 28, 2011

(65) Prior Publication Data

US 2012/0198208 A1    Aug. 2, 2012

(51) Int. Cl.
*G06F 9/30* (2006.01)
*G06F 9/38* (2006.01)
*G06F 7/544* (2006.01)

(52) U.S. Cl.
CPC ............ *G06F 9/3877* (2013.01); *G06F 9/3001* (2013.01); *G06F 9/30036* (2013.01); *G06F 7/544* (2013.01)

(58) Field of Classification Search
CPC ... G06F 15/80; G06F 1/3234; G06F 13/1663; G06F 9/30; G06F 9/3877; G06F 9/3001; G06F 9/30036; G06F 7/544; Y02B 60/1235; Y02B 60/1228
See application file for complete search history.

(56) References Cited

U.S. PATENT DOCUMENTS

| | | | | |
|---|---|---|---|---|
| 4,559,608 A * | 12/1985 | Young et al. | ................... | 708/702 |
| 5,398,198 A | 3/1995 | Mahant-Shetti et al. | | |
| 5,669,010 A * | 9/1997 | Duluk, Jr. | ........................ | 712/22 |
| 6,127,850 A * | 10/2000 | Lan et al. | .......................... | 326/98 |
| 6,466,497 B1 * | 10/2002 | Desai et al. | .................... | 365/203 |
| 7,053,663 B2 * | 5/2006 | Hazucha et al. | .............. | 326/121 |
| 7,187,606 B1 * | 3/2007 | Goel | .............................. | 365/203 |
| 7,320,013 B2 * | 1/2008 | Mukund et al. | ................ | 708/209 |
| 7,761,668 B2 | 7/2010 | Sutardja | | |
| 7,853,634 B2 | 12/2010 | Simkins et al. | | |
| 2005/0134308 A1 | 6/2005 | Okada et al. | | |
| 2008/0162879 A1* | 7/2008 | Jiang | .............................. | 712/204 |

FOREIGN PATENT DOCUMENTS

WO    2007116352    10/2007

OTHER PUBLICATIONS

International Search Report and Written Opinion received for PCT Patent Application No. PCT/US2012/171240, mailed Apr. 5, 2013, 12 pages.

* cited by examiner

*Primary Examiner* — Matthew Bradley
*Assistant Examiner* — Rocio Del Mar Perez-Velez
(74) *Attorney, Agent, or Firm* — Kacvinsky Daisak Bluni PLLC

(57) ABSTRACT

Various embodiments may be disclosed that may share a ROM pull down logic circuit among multiple ports of a processing core. The processing core may include an execution unit (EU) having an array of read only memory (ROM) pull down logic storing math functions. The ROM pull down logic circuit may implement single instruction, multiple data (SIMD) operations. The ROM pull down logic circuit may be operatively coupled with each of the multiple ports in a multi-port function sharing arrangement. Sharing the ROM pull down logic circuit reduces the need to duplicate logic and may result in a savings of chip area as well as a savings of power.

19 Claims, 5 Drawing Sheets

100

400

| Options | Building Block | | 4-ports, 8 functions, 128 WLs, 64 bit | | | Total Area (16 EUs) In mm² |
|---|---|---|---|---|---|---|
| | x | y | x | y | Area / EU | |
| Synthesis | | | | | | 1.20 |
| Single Port ROM – 8 WLs | 6.4 | 1.6 | 102.4 | 122.88 | 12583 * 4 = 50332 | 0.81 |
| Multi-ported ROM – 8 WLs | 17.8 | 2 | 284.8 | 168.6 | 48017 | 0.77 |
| Multi-ported ROM – 16 WLs | 21.8 | 2 | 174.4 | 168.6 | 29404 | 0.47 |
| Multi-ported ROM – 32 WLs | 25.8 | 2 | 103.2 | 168.6 | 17400 | 0.28 |

200

300

500

600

SHARED FUNCTION MULTI-PORTED ROM APPARATUS AND METHOD

BACKGROUND

Many graphics processing cores may include multiple distinct execution engines (EUs). One EU may be an arithmetic logic unit (ALU) that may perform integer, floating point, and logical operations. Another EU may be a math box which may be dedicated to performing extended math functions such as log, sine, exponent, reciprocal square root etc. Some of the math functions may be implemented in the EUs as ROM pull down logic. Moreover, many of the math functions may be implemented using single instruction, multiple data (SIMD) operations. For SIMD operations, the same instruction may be executed on multiple data.

The graphics processing cores typically include multiple channels or ports for exchanging data with other system components and typically implement duplicative ROM pull down logic for each port. Such duplication may lead to increased chip area size and power consumption. Accordingly, there may be a need for improved techniques to solve these and other problems.

DETAILED DESCRIPTION

Figures 1, 4:
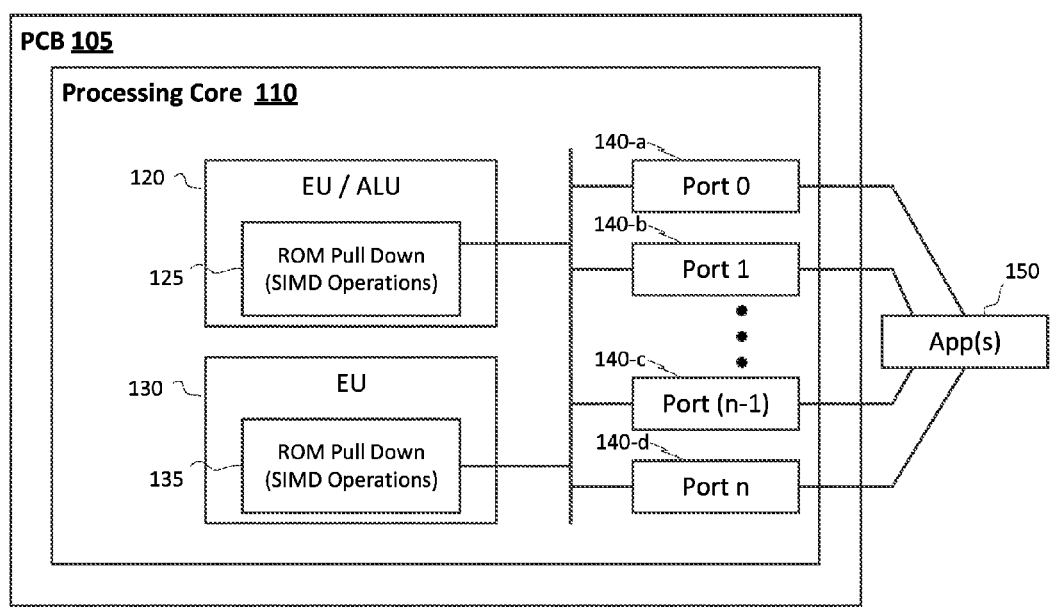
FIG. 1 illustrates a block diagram of an apparatus according to an embodiment.
FIG. 4 illustrates a table of results according to embodiments of the disclosure.

Computer systems often employ or include one or more processing cores operative to carry out instructions associated with applications executing within the computer system. Many processing cores such as graphics processing cores or central processing cores may include distinct execution engines (EUs) operative to perform complex math functions. The math functions may be called by one or more applications executing on the computer system. The processing cores may typically include multiple channels or ports for exchanging data with other system components. Some of the math functions may be implemented in the EUs using ROM pull down logic. Moreover, many of the math functions may be implemented using single instruction, multiple data (SIMD) operations. For SIMD operations, the same instructions may be executed on multiple data. The processing cores may typically implement separate ROM pull down logic for each port. This may necessitate duplicating math function logic for each port associated with a given processing core. Such duplication may lead to increased chip area size and power consumption.

In such cases, however, there may be no need to create duplicate versions of the ROM pull down logic since the math function logic may be shared among the multiple ports of a processing core if it is implemented using SIMD operations. Significant power savings may be achieved as well due to ROM pull down logic port sharing.

The power savings realized by the embodiments described herein are substantial for each device in which they are implemented. In addition to power savings, the embodiments described herein may also utilize less materials. When considering that there are potentially billions if not trillions of battery powered devices utilizing processing cores as described herein, the aggregated savings in power consumption and materials may become enormous. The embodiments described herein may also significantly reduce environmental impact by reducing heat production which may contribute to global warming, extending battery longevity leading to less battery waste disposal, and extending overall device longevity leading to less device waste disposal.

In various embodiments, techniques may be disclosed that may share ROM pull down logic among multiple ports of a processing core. For example, a processing core may be mounted on a printed circuit board (PCB). The processing core may also include multiple ports for communicating with other system components. The processing core may also include at least one execution unit (EU). The EU may include an array of read only memory (ROM) pull down logic storing math functions. Each element of the function array may represent a different function implemented using ROM pull down logic. The ROM pull down logic may implement single instruction, multiple data (SIMD) operations. The function array of ROM pull down logic may be operatively coupled with each of the multiple ports of the processing core. The multiple ports may be operative to supply data to the function array of ROM pull down logic implementing SIMD operations such that each of the multiple ports shares the function array of ROM pull down logic.

In this circuit, it may not be necessary to duplicate the function array of ROM pull down logic for each port in the processing core. Rather, each port may be coupled with the same function array of ROM pull down logic to share the SIMD operations among all the ports. Sharing ROM pull down logic may reduce the need to duplicate logic and may result in a savings of chip area as well as a savings of power.

The processing core may comprise at least one graphics processing unit (GPU), at least one central processing unit (CPU) or a combination of both. In addition, each of the multiple ports may include multiple wordlines operative to supply data to the array of ROM pull down logic for the SIMD operations. Each element of the function array of ROM pull down logic may be operative to execute a function which may be a mathematical function.

The processing core circuit may also include keeper control logic operative to reduce contention to the function array of ROM pull down logic from among the multiple ports. The processing core circuit may also include multiple secondary pre-charge components derived from function selects of the function array of ROM pull down logic. The multiple secondary pre-charge components may be operative to reduce noise to the function array of ROM pull down logic.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram of an apparatus 100 according to an embodiment. Apparatus 100 may be a processing core 110 mounted on a printed circuit board (PCB) 105. The processing core 110 may be a central processing unit (CPU) core, a graphics processing unit (GPU) core, or a combination of both. The processing core 110 may include multiple execution units (EUs) 120, 130. One EU 120, for example, may be an arithmetic logic unit (ALU). Another EU 130, for example, may be a math box. Each of the EUs 120, 130 may include a ROM pull down logic circuit 125, 135 respectively. The ROM pull down logic circuit 125, 135 may be comprised of single instruction, multiple data (SIMD) operations that may be shared among multiple ports (140-*a* through 140-*d*).

SIMD operations describes a type of processing in which the same operation may be performed on multiple data simultaneously. For example, an application that may take advantage of SIMD operations may be one where the same value may be added (or subtracted) to a large number of data points. One example application may be changing the brightness of an image. Each pixel of an image may include three values corresponding to the brightness of the red (R), green (G) and blue (B) portions of the color. To change the brightness, the R, G and B values may be read from memory, a value may be added to make the image brighter (or subtracted to make the image dimmer) to/from the multiple pixel values, and the resulting values may be written back to memory.

SIMD processing provides two improvements to this process. For one the data may be understood to be in blocks. Thus, a number of values may be loaded all at once. Instead of a series of instructions saying "get this pixel, now get the next pixel", a SIMD processor may use a single instruction that effectively says get multiple pixels which may take much less time than getting each pixel individually, as with traditional CPU design.

Another benefit is that SIMD processing may typically include only those instructions that can be applied to all of the data in one operation. In other words, if the SIMD processing works by loading up eight data points at once, an add operation applied to the data may happen to all eight values at the same time.

The ROM pull down logic circuit 125, 135 may be organized as an array of math functions. For example, the math functions may include addition, subtraction, multiplication.

The processing core 110 may also include multiple ports (140-*a* through 140-*d*). The multiple ports (140-*a* through 140-*d*) may supply data from one or more applications 150. For instance, the EUs 120, 130 may perform complex math functions when called by one of the applications 150. The data supplied through the ports (140-*a* through 140-*d*) may be the operands for the math functions. The data returned to the applications 150 may be the results of the math functions.

Figure 2:
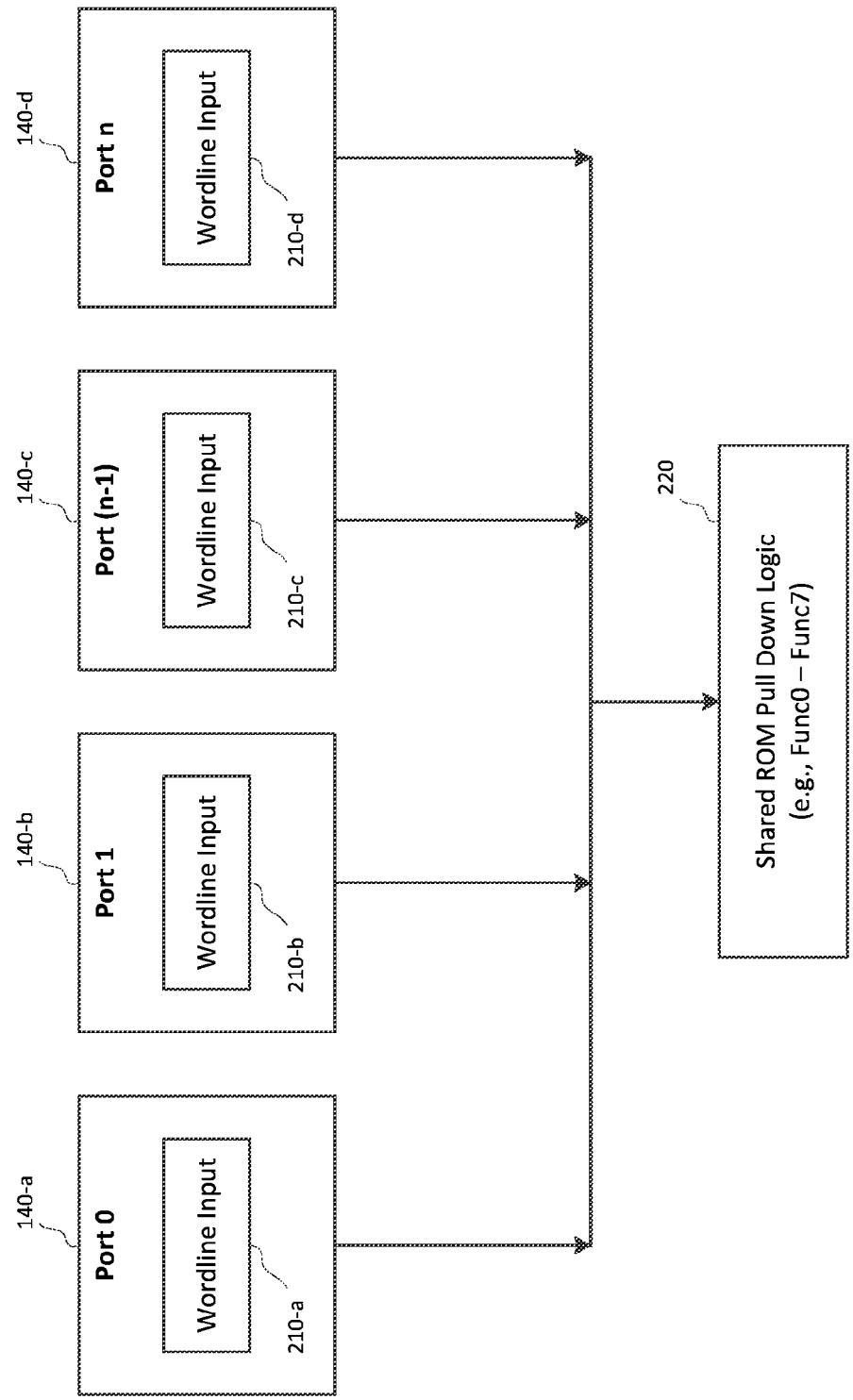
FIG. 2 illustrates a block diagram according to an embodiment.

FIG. 2 illustrates a block diagram 200 according to an embodiment. The multiple ports (140-*a* through 140-*d*) may include multiple wordlines (210-*a* through 210-*d*) respectively. Each of the wordlines may be representative of a particular function. The function may be read out from one of the multiple entries represented by the wordlines (210-*a* through 210-*d*) of the multiple ports (140-1 through 140-*d*). The data from the wordlines (210-*a* through 210-*d*) may then be applied to one of an array of functions implemented as a ROM pull down logic circuit 220 that may be shared among the multiple ports (140-*a* through 140-*d*). The shared ROM pull down logic circuit 220 may store an array of functions that may be implemented as SIMD operations. The use of SIMD operations may permit sharing of the ROM pull down logic circuit 220 by the multiple ports (140-*a* through 140-*d*). There may be no need to duplicate ROM pull down logic circuit 220 for SIMD operations for each of the multiple ports (140-*a* through 140-*d*).

For example, a math function such as an "add" function may be implemented using SIMD operations and stored in as one of the functions implemented in the ROM pull down logic circuit 220. Port 0 140-*a* may be communicatively coupled with an application 150 that may make a function call to the add function implemented in the ROM pull down logic circuit 220 Likewise, port 3 140-*d* may also receive a function call to the add function implemented in the ROM pull down logic circuit 220. Rather than having each port access separate logic for the "add" function, the ports may be tied to the same logic circuit implementing the "add" function. The ports can effectively share the add function logic reducing the need for duplicative hardware logic constructs for SIMD operations.

Figure 3:
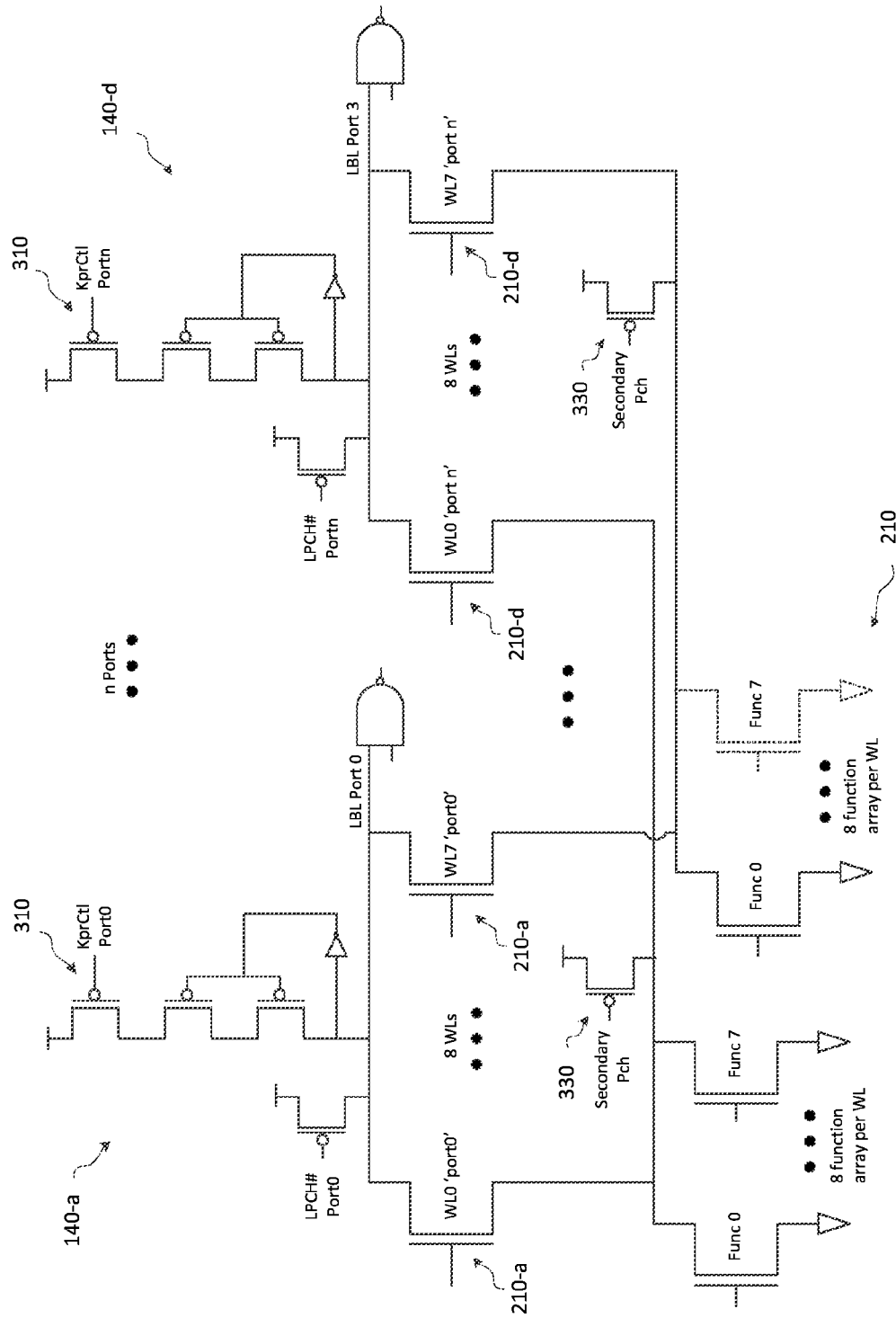
FIG. 3 illustrates a logic circuit according to an embodiment.

FIG. 3 illustrates a processing core logic architecture 300 according to an embodiment. The processing core logic architecture 300 generally comprises the multiple ports 140*a*-140*d* and a ROM pull down logic circuit 220 that may be shared among the multiple ports (140-*a* through 140-*d*). For purposes of illustration, two ports (140-*a* and 140-*d*) have been illustrated.

'Port 0' 140-*a* may be comprised of multiple wordlines 210-*a* capable of delivering data to the ROM pull down logic 220. In this example there are eight (8) wordlines only two (2) of which have been illustrated. Each of the wordlines 210-*a* for 'Port 0' 140*a* may be coupled with a set of functions that comprise an array of ROM pull down logic 220. In the example architecture, the output of wordline 210-*a* labeled WL0 'port 0' may serve as an input to one or more functions labeled 'Func0'-'Func7' of the array of ROM pull down logic 220. Similarly, the output of wordline 210-*a* labeled WL7 'port 0' may serve as an input to another set of one or more functions labeled 'Func0'-'Func7' of the array of ROM pull down logic 220. Each wordline may be associated with its own set of functions within the array of ROM pull down logic 220.

Likewise, 'Port n' 140-*d* may be comprised of multiple wordlines 210-*d*. In this example there are eight (8) wordlines only two (2) of which have been illustrated. Each of the wordlines 210-*d* for 'Port n' 140*d* may be coupled with the same set of functions that comprise the array of ROM pull down logic 220 as for 'Port 0' 140-*a*. In the example architecture, the output of wordline 210-*d* labeled WL0 'port n' may serve as an input to one or more functions labeled 'Func0'-'Func7' of the array of ROM pull down logic 220.

Similarly, the output of wordline 210-*a* labeled WL7 'port n' may serve as an input to another set of one or more functions labeled 'Func0'-'Func7' of the array of ROM pull down logic 220. Each wordline may be associated with its own set of functions within the array of ROM pull down logic 220.

The WL0 'port 0' output and the WL0 'port n' output may be tied together such that the two separate wordlines may be able to simultaneously access the same set of SIMD functions rather than each port implementing its own set of SIMD functions. This sharing of the logic circuit 220 may be implemented for SIMD operations since the same instruction may be used for multiple data.

Tying the various wordline outputs from the different ports (140-*a* through 140-*d*) together may increase the capacitance on the intermediate node. To help address this issue, keeper control (KprCtl) logic 310 may be included to reduce the contention and avoid any unnecessary increase in ROM pulldown sizes. In addition, multiple secondary pre-charge devices 330 may be added to the output for each wordline (210-*a* through 210-*d*) to address charge sharing concerns across the multiple ports (140-a through 140-d). Control for the secondary pre-charge devices 330 may be derived from function selects.

While not shown, each of the ports between 'Port 0' and 'Port n' are similarly structured and coupled. The result is a multi-port ROM pull down logic circuit that permits function sharing across multiple ports (140-a through 140-d). The number of ports, wordlines, and functions illustrated in FIG. 3 is exemplary. One of ordinary skill in the art may readily adapt the teachings herein to different circuits that may be comprised of a different number of ports, wordlines, and functions. The embodiments are not limited in this context.

FIG. 4 illustrates a table 400 of results according to embodiments of the disclosure. The table 400 illustrates a surface area comparison between using a traditional method of multiple ROM pull down logic versus using a multi-ported ROM pull down according to embodiments described herein. In traditional ROM pull down logic implementations for a graphics processing core, the functions (ROM pull down logic) and ports have been implemented through synthesis. For example, row 1 of the table 400 illustrates the area numbers from such a traditional synthesis implementation. Because the logic is scattered all around, there may be no defined 'x' and 'y' dimensions. The total area needed for the synthesis implementation based on a four (4) port, eight (8) function, 128 wordline, and 64 bit circuit may be 1.2 mm$^2$ for a 32 nm chip circuit. Referring to row 4 of table 400 (multi-ported—16 WLs), a custom designed multi-ported ROM for the same four (4) port, eight (8) function, 128 wordline, and 64 bit circuit, results in a savings of 0.73 mm$^2$ for the 32 nm chip circuit. Translating the results to a 22 nm chip circuit would result in an area savings close to 0.35 mm$^2$. Power savings are also significant power due to z reduction. Though the multi-ported ROM in question may not show significant savings in comparison to single ported ROM (e.g., row 2), as the number of functions increase the area savings will become significant.

Various embodiments may describe an apparatus comprising a read-only memory (ROM) pull down logic circuit 220 storing single instruction, multiple data (SIMD) operations and multiple ports (140-a through 140-d) communicatively coupled with the ROM pull down logic circuit 220. The ROM pull down circuit 220 may be coupled with the multiple ports such that each of the multiple ports (140-a through 140-d) shares the ROM pull down logic circuit 220. The ROM pull down logic circuit 220 may be operative to execute a function (e.g., a mathematical function) comprised of SIMD operations. Since multiple ports (140-a through 140-d) may be sharing the same ROM pull down logic circuit 220, keeper control logic 310 operative to reduce contention to the ROM pull down logic circuit 220 may be implemented for each of the multiple ports (140-a through 140-d).

In addition, multiple secondary pre-charge components 330, each associated with a different one of the multiple ports (140-a through 140-d), may be implemented. The multiple secondary pre-charge components 330 may be operative to reduce noise to the ROM pull down logic circuit 220 and ensure sufficient voltages are maintained. The secondary pre-charge components 330 may be derived from function selects.

Each of the multiple ports (140-a through 140-d) may include multiple wordlines (210-a through 210-d) per port. The multiple wordlines (210-a through 210-d) may be operative to supply data to the ROM pull down logic circuit 220. The ROM pull down logic circuit 220 may comprise an array of functions in which each function may be implemented by SIMD operations.

In another embodiment, a system may include a printed circuit board (PCB) 105 and a processing core 110 mounted on the PCB 105. The processing core 110 may include multiple ports (140-a through 140-d) operative to exchange data with other components. The processing core 110 may also include at least one execution unit (EU) 130 operative on the processing core 110. The EU 130 may include a logic circuit 220 comprised of an array of read-only memory (ROM) pull down logic storing single instruction, multiple data (SIMD) operations operative to execute a corresponding array of functions. The logic circuit 220 may be operatively coupled with each of the multiple ports (140-a through 140-d). The multiple ports (140-a through 140-d) may be operative to supply data to the logic circuit 220 such that each of the multiple ports (140-a through 140-d) shares the logic circuit 220.

The processing core may comprise at least one graphics processing unit (GPU), at least one central processing unit (CPU), or a combination thereof. The multiple ports (140-a through 140-d) may include multiple wordlines (210-a through 210-d) in which each wordline may be operative to supply data to the array of ROM pull down logic 220 for the SIMD operations.

In another embodiment, a read-only memory (ROM) pull down logic circuit 220 may be communicatively coupled with multiple ports (140-a through 140-d) of a processing core 110. The ROM pull down logic circuit 220 may be operative to execute single instruction, multiple data (SIMD) operations on data received from any one of the multiple ports (140-a through 140-d). The SIMD operations may operative to execute a function using the data received from the multiple ports (140-a through 140-d) as operand data for the function. In addition, the ROM pull down logic circuit 220 may include an array of function logic in which each element of the array may be associated with a different function.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 5:
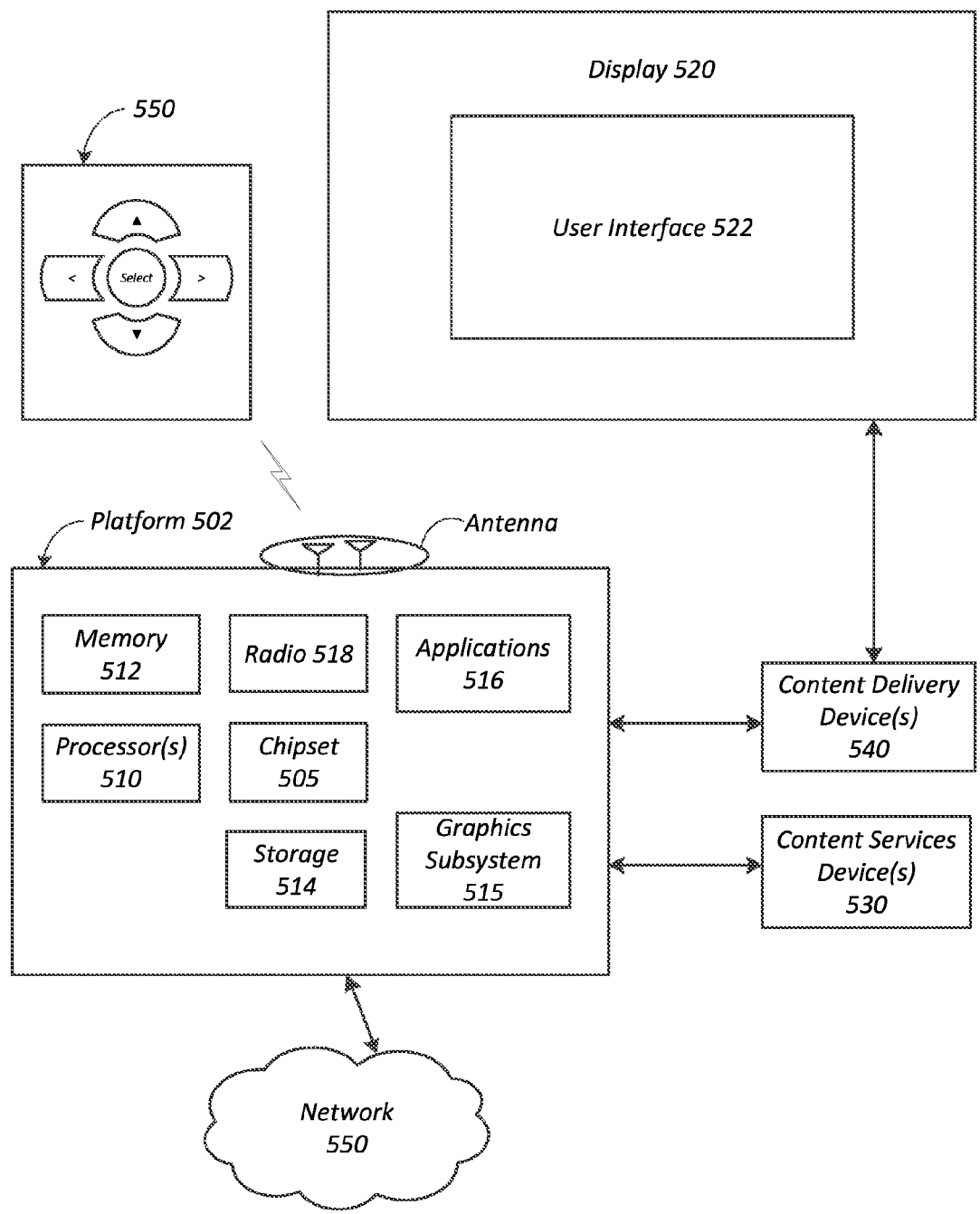
FIG. 5 illustrates an embodiment of a system that may be suitable for implementing embodiments of the disclosure.

FIG. 5 illustrates an embodiment of a system 500 that may be suitable for implementing the multi-port ROM pull down processing embodiments of the disclosure. In embodiments, system 500 may be a system capable of multi-port ROM pull down processing although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 500 comprises a platform 502 coupled to a display 520. Platform 502 may receive content from a content device such as content services device(s) 530 or content delivery device(s) 540 or other similar content sources. A navigation controller 550 comprising one or more navigation features may be used to interact with, for example, platform 502 and/or display 520. Each of these components is described in more detail below.

In embodiments, platform 502 may comprise any combination of a chipset 505, processor(s) 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor(s) 510 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor(s) 510 may comprise dual-core processor(s), dual-core mobile processor(s), and so forth.

Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 514 may comprise technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (VPU), for example. An analog or digital interface may be used to communicatively couple graphics subsystem 515 and display 520. For example, the interface may be any of a High-Definition Multimedia Interface, DisplayPort, wireless HDMI, and/or wireless HD compliant techniques. Graphics subsystem 515 could be integrated into processor 510 or chipset 505. Graphics subsystem 515 could be a stand-alone card communicatively coupled to chipset 505.

The graphics and/or video processing techniques described herein may be implemented in various hardware circuits. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 518 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In embodiments, display 520 may comprise any television type monitor or display. Display 520 may comprise, for example, a computer display screen, touch screen display, video monitor, television-like device, and/or a television. Display 520 may be digital and/or analog. In embodiments, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520.

In embodiments, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520.

In embodiments, content services device(s) 530 may comprise a cable television box, personal computer, network, telephone, Internet enabled devices or appliance capable of delivering digital information and/or content, and any other similar device capable of unidirectionally or bidirectionally communicating content between content providers and platform 502 and/display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 receives content such as cable television programming including media information, digital information, and/or other content. Examples of content providers may include any cable or satellite television or radio or Internet content providers. The provided examples are not meant to limit embodiments of the invention.

In embodiments, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be echoed on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but integrated into platform 502 and/or display 520. Embodiments, however, are not limited to the elements or in the context shown or described herein.

In embodiments, drivers (not shown) may comprise technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 when the platform is turned "off." In addition, chip set 505 may comprise hardware and/or software support for 5.1 surround sound audio and/or high definition 5.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the invention.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
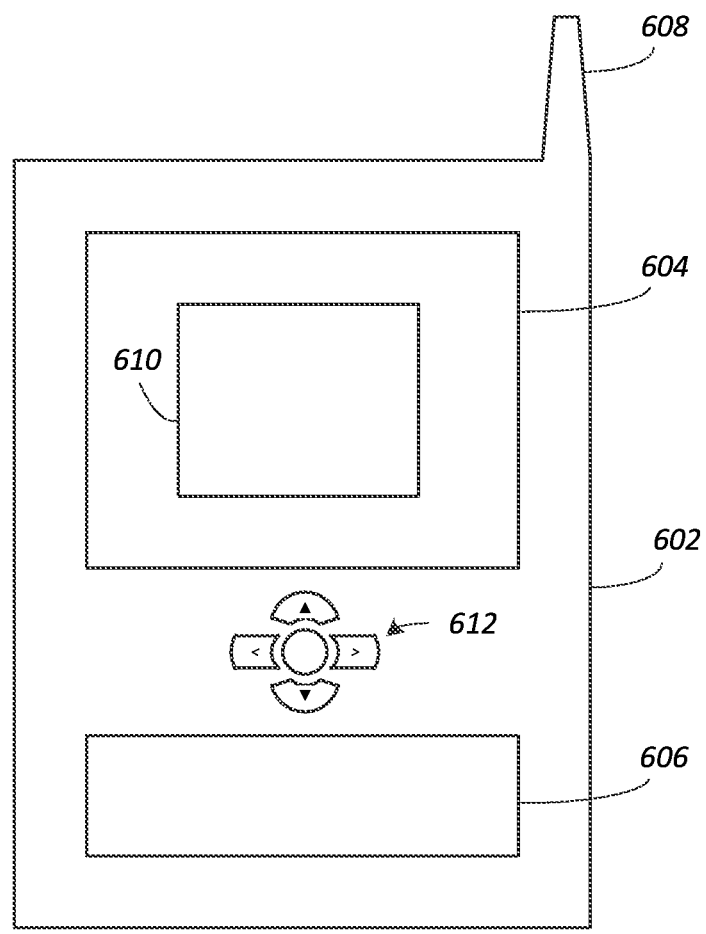
FIG. 6 illustrates embodiments of a small form factor device in which the system of FIG. 5 may be embodied.

As described above, system 500 may be embodied in varying physical styles or form factors. FIG. 6 illustrates embodiments of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 602, a display 604, an input/output (I/O) device 606, and an antenna 608. Device 600 also may comprise navigation features 612. Display 604 may comprise any suitable display unit for displaying information appropriate for a mobile computing device. I/O device 606 may comprise any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Embodiments may also be at least partly implemented as instructions contained in or on a non-transitory computer-readable medium, which may be read and executed by one or more processors to enable performance of the operations described herein.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed circuit. It is, of course, not possible to describe every conceivable combination of components and/or methodologies, but one of ordinary skill in the art may recognize that many further combinations and permutations are possible. Accordingly, the novel circuit is intended to embrace all such alterations, modifications and variations that fall within the spirit and scope of the appended claims.

What is claimed is:

1. An apparatus comprising:
    an execution unit comprising a logic circuit, the logic circuit operative to execute:
        a first array of functions comprised of a first set of single instruction, multiple data (SIMD) operations; and
        a second array of functions comprised of a second set of SIMD operations; and
    multiple ports communicatively coupled with the logic circuit, each of the multiple ports comprising a plurality of wordlines operative to supply data to the logic circuit, a first one of the plurality of wordlines of each of the multiple ports to share the logic circuit to access the first array of functions and a second one of the plurality of wordlines of each of the multiple ports to share the logic circuit to access the second array of functions.

2. The apparatus of claim 1, at least one function of the first array of functions comprising a mathematical function.

3. The apparatus of claim 1, comprising keeper control logic operative to reduce contention to the logic circuit.

4. The apparatus of claim 3, comprising keeper control logic for each of the multiple ports, the keeper control logic operative to reduce contention to the logic circuit.

5. The apparatus of claim 1, comprising a secondary pre-charge component operative to reduce noise to the logic circuit.

6. The apparatus of claim 5, wherein the secondary pre-charge component is derived from a function select.

7. The apparatus of claim 1, comprising multiple secondary pre-charge components operative to reduce noise to the logic circuit, each secondary pre-charge component associated with a different one of the multiple ports.

8. The apparatus of claim 1, the first set of SIMD operations different than the second set of SIMD operations.

9. A system comprising:
    a printed circuit board (PCB);
    a processing core mounted on the PCB, the processing core including multiple ports, each of the multiple ports comprising a plurality of wordlines; and
    at least one execution unit (EU) operative on the processing core, the at least one EU including a logic circuit comprised of:
        a first array of logic storing a first set of single instruction, multiple data (SIMD) operations operative to execute a corresponding array of functions; and
        a second array of logic storing a second set of SIMD operations,
    the logic circuit operatively coupled with each of the multiple ports to facilitate power reduction, the multiple ports operative to supply data to the logic circuit such that a first one of the plurality of wordlines of each of the multiple ports shares the logic circuit to access the first set of SIMD operations and a second one of the plurality of wordlines of each of the multiple ports shares the logic circuit to access the second set of SIMD operations.

10. The system of claim 9, the processing core comprising at least one graphics processing unit (GPU).

11. The system of claim 9, the processing core comprising at least one central processing unit (CPU).

12. The system of claim 9, comprising keeper control logic for each of the multiple ports, the keeper control logic operative to reduce contention to the logic circuit.

13. The system of claim 9, comprising multiple secondary pre-charge components derived from function selects and operative to reduce noise to the logic circuit, each secondary pre-charge component associated with a different one of the multiple ports.

14. The system of claim 9, the first set of SIMD operations different than the second set of SIMD operations.

15. An apparatus comprising:
   an execution unit comprising a logic circuit communicatively coupled with multiple ports of a processing core to facilitate power reduction, each of the multiple ports comprising a plurality of wordlines, the logic circuit operative to:
   execute a first set of single instruction, multiple data (SIMD) operations on data received from a first one of the plurality of wordlines of each of the multiple ports; and
   execute a second set of SIMD operations operative on data received from a second one of the plurality of wordlines of each of the multiple ports.

16. The apparatus of claim 15, the first set of SIMD operations operative to execute a first function using the data received from the multiple ports as operand data for the first function and the second set of SIMD operations operative to execute a second function using the data received from the multiple ports as operand data for the second function.

17. The apparatus of claim 15, the logic circuit including a first array of function logic, each element of the first array of function logic associated with a different function.

18. The apparatus of claim 17, each element of the first array of function logic communicatively coupled with a secondary pre-charge component operative to reduce noise to the logic circuit.

19. The apparatus of claim 15, the first set of SIMD operations different than the second set of SIMD operations.

\* \* \* \* \*